Patented Mar. 5, 1929.

1,704,622

UNITED STATES PATENT OFFICE.

LOUIS G. MAUER, OF NEW YORK, N. Y.

COATING COMPOSITION AND METHOD OF MAKING THE SAME.

No Drawing. Application filed September 13, 1921, Serial No. 500,415. Renewed October 10, 1924.

The present invention relates to an improved coating material and method of making the same. One object has been to provide a coating material in which are combined all the desirable characteristics of paint and cement without the disadvantages of either.

It has long been realized that paint as a protective or decorative covering for parts of buildings or other structures has many defects which not only limit the scope of its application, but which also render the paint unsatisfactory even where it is commonly used for want of a better or more adaptable material. Thus, at ordinary temperatures, paint provides a satisfactory coating for some purposes, but it is destroyed by heat so that it is not practicable for structures in which relatively elevated temperatures occur. Furthermore, paint is very dependent so far as its adhesive properties are concerned, upon the character and condition of the surface to which it is applied.

Cement in the form of a wash has been utilized as a coating medium, but it also is subject to many limitations which render its extensive use impossible and in many instances entirely unsatisfactory. One feature of cement, namely its inorganic character, makes it more desirable as a covering medium than ordinary paint which frequently contains a substantial proportion of vegetable oils and which is therefore more easily broken down by extremes of temperature, by exposure to the weather, and by chemical action. One of the objects of my invention has been to make a coating material which will incorporate the relative indestructibility of cement and which at the same time can be applied in a manner analogous to that in which paint is ordinarily applied. Furthermore, it has been found that cement in the form of a wash is adherent to certain kinds of surfaces, but relatively non-adherent to other kinds of surfaces. A further object of my invention has been to embody cement in a composition or mixture which makes it impossible for the cement to adhere to almost any and every kind and character of surface to which coatings, either protective or ornamental, are ordinarily applied and thus impart to such surfaces the characteristic hardness of cement.

In making the coating material forming the subject matter of the present application, I have found that the ingredients may be supplied in widely varying proportions to produce an effective coating material varying in some respects in its action during use and in the results secured after application to any given surface. However, a good commercial product of general utility is produced by mixing the ingredients in the manner hereinafter explained in detail. For example, 150 lbs. of a cementitious material, such as white Portland cement, and 75 lbs. of a silicious material, such as silica, of a fineness of from 100 to 120 mesh, are placed in a suitable mixing device, such, for example, as a dough mixer. Sufficient water to reduce the cement and silica to a paste is introduced, and to this paste is added a solution containing 3½ lbs. of Japanese vegetable wax, 3½ lbs. of hide glue, and 1½ lbs. of alum, said ingredients having been previously added to water and reduced with a quantity of caustic soda sufficient to assist in breaking down the wax. The mass is then thoroughly mixed by agitation in the mixer. During this stage suitable oils are added, such as 1 gallon of linseed oil, 2 gallons of China wood or tung oil, and 2 gallons of kerosene. The continued agitation of the mass apparently produces a composition in which the cement and silica are suspended in a mixture containing oil and water probably in the condition of an emulsion. That the oil and water exist in this condition is rendered probable by the fact that the mixture contains alum, which is known to possess, under many conditions, the properties of an "emulsifying agent", that is, an agent which facilitates the formation and the maintenance of an emulsion. Furthermore, since the alum is the probable emulsifying agent, the emulsion, is such it is, is probably one in which the water, in the form of small globules, is surrounded by films of oil; that is, the water is the "interior" and the oil the "exterior phase" of the emulsion.

In this condition the batch is poured off into a vat. After standing for about two hours, the mixture will show signs of stiffening or setting and when this condition arises, it is agitated by suitable means such as a hoe or other implement. The operation of agitating is repeated as often as is necessary or at intervals of approximately one hour over a period of from 7 to 9 hours, and at the last agitation water is added in sufficient quantity to produce a consistency similar to that which the material had upon its being originally poured from the mixer. The batch may then be permitted to rest for fifteen hours or more or until it acquires a thick, almost solid consistency somewhat like partially set mortar, plastic but not fluid.

When in this condition, the batch is again introduced into the mixer, together with about ½ gallon of equal parts of tung oil and kerosene, and the mass is agitated, whereupon a considerable portion of the water content is released and drawn off until the mass becomes gummy and tends to cling in a lump to the blades of the agitating machine. It appears that excess of water is absorbed by the mass of the material and aids in hydrating some of the substances such as, for example, the cement or the alum. Upon agitation it is found that water bubbles out of the mass being agitated, and in this manner excess of water is removed.

At this point, 1 gallon of vegetable oil and sufficient kerosene, are added to break down the gummy mass and again render the mixture fluid. In this condition, sand up to 20 mesh in size is added gradually until about 300 lbs. have been incorporated. If the addition of the sand tends to thicken the mixture to such an extent that an effective mixing of the ingredients ceases, then more kerosene oil may be supplied.

If the process is discontinued at this point, the material can be utilized as a coating and can be brushed on to a surface like paint; but for this work the material should be used within a relatively short time after the mixing operation. It produces an effective hard coating of substantially the color of the cement used. However, continuing the process to secure a more stable suspension of the solids, the mixture is "aged" or "cured" by being screened into a vat and allowed to stand for approximately 24 hours, when it is agitated with a hoe or other suitable device and 1 gallon of vegetable oil and a suitable amount of kerosene are added to increase the fluidity of the mass. Agitation is repeated at intervals of 24 hours for 2 or 3 additional days to permit curing.

The coating mixture produced according to the above described process is in a fluid condition and does not harden as long as it is not exposed to the air. In other words, when placed in barrels or cans, it retains an effective operative condition without hardening or settling until applied in the contemplated manner. The sand and silica remain in suspension and no change in specific gravity takes place as between different strata of the same batch.

In this condition, the material is ready for commercial use and if too thick or too viscous may be thinned to any required degree by the addition of oil, preferably a mixture of vegetable oil and kerosene; or, if too thin for the contemplated purpose sand may be added up to 5 lbs. per 13 lbs. or 1 gallon of material and the mixture may still be applied with a brush. For other uses it will be found advisable to add up to 20 lbs. of sand per 13 lbs. of material. In this condition, the mixture approximates the consistency of mortar or concrete and may be applied with a trowel.

Upon exposure to the air in a relatively thin coating, either such as is produced by applying with a brush or by applying with a trowel, the coating gradually hardens and exhibits the setting characteristics of cement, the sand being bound securely to the surface to which the material is applied. Hardening continues over an extended period and yet the coating retains a degree of elasticity which is not characteristic of dried coatings of well known cement wash mixtures. In this respect, the substance resembles paint. I have found that the mixture described above, while it brushes on and forms an effective coating, may not flow as freely and smoothly as may be required for some purposes. To overcome this condition and to "lubricate" the material, I add about 30 lbs. of asbestos pulp after the addition of the 300 lbs. of sand as described above and continue the agitation until the mixture is complete after which it is screened off and cured in the manner hereinabove set forth.

Where it is desired to produce a coating containing material in fibrous form, I add to the screened material about 20 lbs. of asbestos fiber of suitable length and then agitate to effect a thorough mixture. This material is also cured as above. It is also possible to introduce the asbestos fiber after the material has cured. Whichever course is followed, the material in use hardens to a tough and relatively elastic coating otherwise similar in character to the material first described.

In order to meet certain requirements as to decorative effects, the color of the material thus far described may be varied considerably by using sands of different colors. Thus, it has been found possible to produce a reddish colored coating by incorporating in the mixture a quantity of red sand. Sands of other colors or combinations of sand of different colors may also be used, thus making it possible to imitate the appearance of stone, marble or granite.

Where the material is intended for use as a coating which will be capable of a very wide range of coloration and of minute gradations of color, an effective color sensitiveness is produced by incorporating in the mixture, preferably just after the addition of the 300 pounds of sand, a color sensitive material such as titanium oxide, white lead or zinc oxide. I have found that a satisfactory color sensitive composition is produced by adding about 12 to 15 lbs. of said titanium oxide or "Titanox," which is the commercial name, to the batch above described. The color sensitiveness of the composition or ability to assume a tone of any suitable added pigment thereby produced is independent of the asbestos pulp or asbestos fiber afterward added. Obviously, with such a wide range of variation in texture, coloration and consistency, the coating material which I have described is capable of very wide use not only as a medium for preserving the materials to which it is applied, but also as a decorating medium capable of being colored to any required extent by the admixture of suitable coloring agents. Coatings of my improved material have been subjected to heat in excess of 600° F. without separating from the metal to which the material was applied. Likewise, coatings of this material have withstood low temperatures such as are experienced in northern sections of the United States.

An important utility of this improved coating material is involved in its application to cold water pipes or other cooled conduits in the vicinity of which there is condensation in a humid atmosphere or, in fact, to the surface of any material or structure upon which condensation takes place by reason of the variation in temperature between said material or structure and the surrounding atmosphere. Such materials or structures coated with my improved coating are free from any deposit of moisture resulting from condensation at ordinary temperatures. The property by reason of which this phenomenon results is not known to the applicant, but it is likely that further research and analysis will at least develop a theory in explanation thereof. Furthermore, the material is also an effective insulating medium when applied to heat exchange surfaces and resists combustion when used as a covering for combustible materials.

It has also been observed that the surfaces upon which the coating material of the present invention has thoroughly hardened are non-absorptive and therefore resist water and moisture to an effective degree. This renders the material particularly useful as an exterior finish for stone, brick, and concrete or other relatively absorptive surfaces which are exposed to the weather. Other and equally important uses have been found for the material and it is contemplated that it will find even broader application as its properties become better known.

It is of course to be understood that my invention is not limited to the particular embodiments thereof, herein described for purposes of illustration only.

What I claim is:

1. A coating composition comprising at least partially set cement, water and a pigment in permanent suspension in an "exterior phase" of oil.

2. A homogeneous coating composition comprising cement, sand and water in thick suspension in an oily medium, said composition retaining its state of homogeneity for a considerable period of time and retaining a state of plasticity when packed in a substantially airtight receptacle.

3. A coating composition comprising at least partially set cement, sand, and titanium oxide in substantially permanent suspension in an oily medium comprising mineral and vegetable oils.

4. A coating composition comprising at least partially set cement, sand, a pigment base and asbestos pulp in substantially permanent suspension in an oily medium comprising mineral and vegetable oils.

5. A coating composition comprising at least partially set cement, sand, a pigment base and asbestos pulp in substantially permanent suspension in an oily medium comprising mineral and vegetable oils, an adhesive and alum.

6. A process of preparing a coating composition which comprises intimately mixing cementitious and silicious materials with an excess of water containing alum and an organic colloid, mixing oil with the materials to form a homogeneous mixture therewith, permitting the mixture to set sufficiently to a self-sustaining non-fluent form, agitating the mass so formed to release the water, removing excess water and dispersing the resulting mixture in additional oil.

In testimony whereof, I have signed my name to this specification this tenth day of September, 1926.

LOUIS G. MAUER.

CERTIFICATE OF CORRECTION.

Patent No. 1,704,622.                Granted March 5, 1929, to

LOUIS G. MAUER.

It is hereby certified that error appears in the printed specification of the above numbered patent requiring correction as follows: Page 1, line 48, for the word "impossible" read "possible", and line 97, for the word "is" read "if"; and that the said Letters Patent should be read with these corrections therein that the same may conform to the record of the case in the Patent Office.

Signed and sealed this 2nd day of April, A. D. 1929.

(Seal)                                              M. J. Moore,
                                             Acting Commissioner of Patents.